(12) United States Patent
Wang et al.

(10) Patent No.: US 8,649,089 B2
(45) Date of Patent: Feb. 11, 2014

(54) SYSTEM AND METHOD FOR ADJUSTING A BEAM EXPANDER IN AN IMAGING SYSTEM

(75) Inventors: Shaohong Wang, Belle Mead, NJ (US); Ahmad Yekta, Somerset, NJ (US)

(73) Assignee: GE Healthcare Bio-Sciences Corp., Piscataway, NJ (US)

( * ) Notice: Subject to any disclaimer, the term of this patent is extended or adjusted under 35 U.S.C. 154(b) by 380 days.

(21) Appl. No.: 13/122,439

(22) PCT Filed: Oct. 7, 2009

(86) PCT No.: PCT/US2009/059780
§ 371 (c)(1),
(2), (4) Date: Apr. 4, 2011

(87) PCT Pub. No.: WO2010/042576
PCT Pub. Date: Apr. 15, 2010

(65) Prior Publication Data
US 2011/0188105 A1    Aug. 4, 2011

Related U.S. Application Data

(60) Provisional application No. 61/104,003, filed on Oct. 9, 2008.

(51) Int. Cl.
*G02B 21/06* (2006.01)
(52) U.S. Cl.
USPC .......................................................... 359/385

(58) Field of Classification Search
USPC .......................................... 359/368, 385–390
See application file for complete search history.

(56) References Cited

U.S. PATENT DOCUMENTS

| 5,523,543 | A  | * | 6/1996  | Hunter et al. ............ 219/121.62 |
| 6,081,371 | A  |   | 6/2000  | Shioda et al. |
| 6,134,002 | A  |   | 10/2000 | Stimson et al. |
| 6,313,944 | B2 | * | 11/2001 | Kawahito ...................... 359/388 |
| 7,235,777 | B2 |   | 6/2007  | Hecht |
| 7,329,860 | B2 | * | 2/2008  | Feng et al. .................... 250/234 |
| 7,355,722 | B2 |   | 4/2008  | Hill |
| 2006/0017001 | A1 | * | 1/2006 | Donders et al. .......... 250/390.07 |

* cited by examiner

*Primary Examiner* — Alessandro Amari

(57) ABSTRACT

A line confocal microscope system, comprising an illumination system with a source of collimated light and a line forming optics arranged to provide a line shaped illumination area to be scanned over a sample, an image receiving system, and two or more objective lenses that are interchangeable in the optical path to provide different magnification, wherein the objective lenses have different aperture diameters, and the illumination system comprises a beam shape transformer arranged in between the source of collimated light and the line forming optics to selectively transform the cross-sectional shape of the collimated beam of light transmitted to the line forming optics to a predetermined shape in response to the back aperture diameter of the objective lens that is arranged in the optical path.

5 Claims, 9 Drawing Sheets

SYSTEM AND METHOD FOR ADJUSTING A BEAM EXPANDER IN AN IMAGING SYSTEM

CROSS REFERENCE TO RELATED APPLICATIONS

This application is a filing under 35 U.S.C. §371 and claims priority to international patent application number PCT/US2009/059780 filed Oct. 7, 2009, published on Apr. 15, 2010 as WO 2010/042576, which claims priority to U.S. provisional patent application No. 61/104,003 filed Oct. 9, 2008; the entire disclosure of which is incorporated herein by reference in its entirety.

FIELD OF THE INVENTION

The present invention relates to a system and method for adjusting an illumination beam expander in an imaging system to provide for optimized illumination.

BACKGROUND OF THE INVENTION

Generally, when researching tiny regions of interest on a sample, researchers often employ a microscope to observe the sample. The microscope may be a conventional wide-field, fluorescence, epi-fluorescence or confocal microscope. The optical configuration of such a microscope typically includes a light source, illumination optics, objective lens, sample holder, imaging optics and a detector. Light emitted from the light source illuminates the region of interest on the sample after propagating through the illumination optics and the objective lens. Microscope objective forms a magnified image of the object that can be observed via eyepiece, or in case of a digital microscope, the magnified image is captured by the detector and sent to a computer for live observation, data storage, and further analysis.

The light source sends an excitation light that reaches the objective of an epi-fluorescence microscope that should ideally completely fill-in its back aperture. However, due to the design of the objective lenses these lenses have different numerical aperture (NA) that have different aperture diameters, which under conditions of a constant beam diameter may prevent the back aperture from being completely filled. Under-filling of the objective aperture leads to a smaller effective NA and thereby degradation of the lateral and axial resolution in general, and of optical sectioning performance for confocal systems. Over-filling of the objective aperture only uses a fraction of the excitation energy and results in decreased illumination efficiency.

There have been prior patents, such as U.S. Pat. No. 6,081,371 where for point-confocal and widefield microscopes the excitation beam diameter can be easily adjusted to match different objectives using a conventional zoom system. For these patents, the beam is circularly symmetric about the optical axis and the zooming optical elements maintain that symmetry. In contrast, in a line-confocal system the beam lacks circular symmetry and a specialized zooming solution is required. The application of a point confocal zooming system, as shown in this patent, to a line-confocal microscope is undesired because it leads to significant image non-uniformity.

With regard to other prior patents, such as U.S. Pat. No. 7,235,777 a complex design is proposed to achieve near one-dimensional zooming. However, this patent is a complex design that does not provide an optimized illumination system for all of the supported objectives. Therefore, there is a need for a simple adjustable system that provides optimized illuminations of back apertures for all the supported objectives.

SUMMARY OF THE INVENTION

The object of the invention is to provide a new line scan confocal microscope, which overcomes one or more drawbacks of the prior art. This is achieved by the line scan confocal microscope as defined in the independent claim.

One advantage with such a line scan confocal microscope is that it provides improved illumination of the back aperture diameter for a wide range of objective lenses using a much less complex design compared to the prior art.

Further scope of applicability of the present invention will become apparent from the detailed description given hereinafter. However, it should be understood that the detailed description and specific examples while indicating preferred embodiments of the invention are given by way of illustration only. Various changes and modifications within the spirit and scope of the invention will become apparent to those skilled in the art from the detailed description below.

DETAILED DESCRIPTION OF THE INVENTION

The presently preferred embodiments of the invention are described with reference to the drawings, where like components are identified with the same numerals. The descriptions of the preferred embodiments are exemplary and are not intended to limit the scope of the invention.

According to one embodiment, there is provided a line confocal microscope system, comprising an illumination system, an image receiving system, and two or more objective lenses, wherein the illumination system comprises a beam shape transformer. The illumination system comprises a source of collimated light, e.g. a point light source and a collimator as disclosed in detail below and a line forming optics, e.g. an aspherical optic component, arranged to provide a line shaped illumination area to be scanned over a sample. The image receiving system comprises collection optics, a detector unit arranged to detect the emitted radiation from the sample, and image forming means as will be discussed in more detail below. The two or more objective lenses that are interchangeable in the optical path to provide different magnification, and as discussed above the objective lenses have different aperture diameters. The beam shape transformer is arranged in between the source of collimated light and the line forming optics to selectively transform the cross-sectional shape of the collimated beam of light transmitted to the line forming optics to a predetermined shape in response to the back aperture diameter of the objective lens that is arranged in the optical path, e.g. as will be disclosed in details below.

Figure 2:
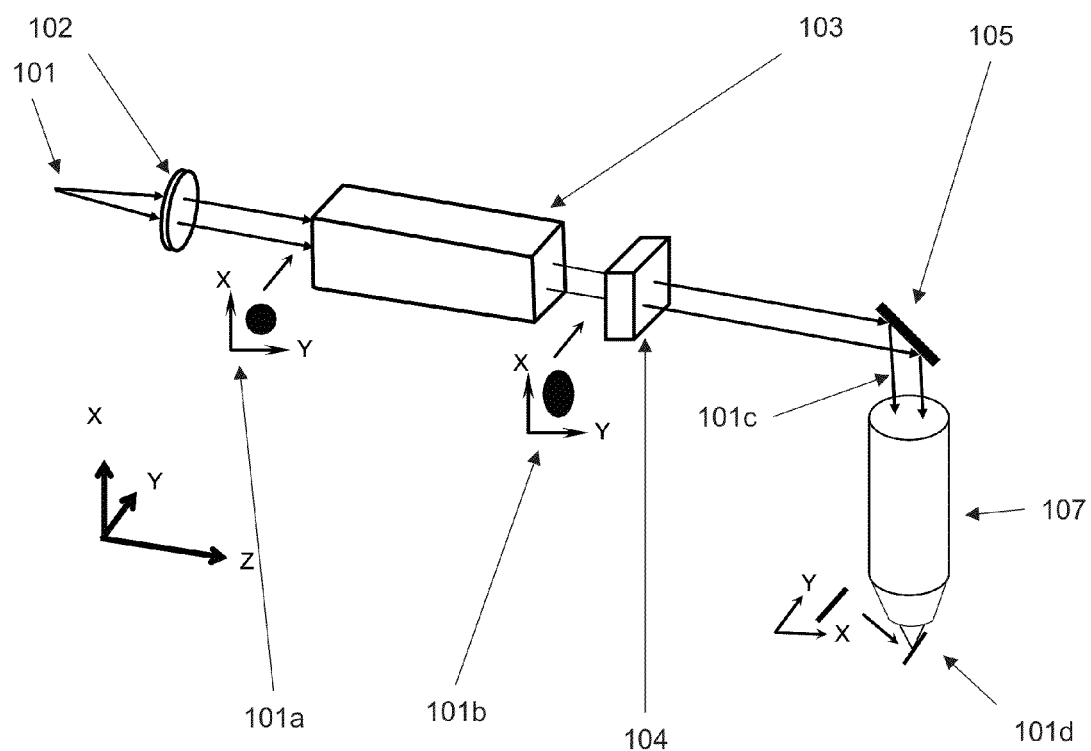
FIG. 2 is a schematic ray trace illustration of the illumination system of FIG. 1 in accordance with the invention.

According to one embodiment, the line forming optics is of aspherical type and the beam shape transformer is arranged to selectively control the cross-sectional extension of the collimated beam of light essentially in a direction transverse, X direction in FIG. 2, to the extension direction of the line shaped illumination area. The beam shape transformer may be a cylindrical zoom expander comprising two or more cylindrical lenses, and as disclosed by the detailed description of one embodiment below the beam shape transformer may comprise a fixed entrance lens, and two zoom lenses mutually moveable along the optical path. In such an embodiment the line scan confocal microscope further comprises a control system arranged to control the moveable lenses of the beam shape transformer to predetermined positions in response to the back aperture diameter of the objective lens that is arranged in the optical path. According to another embodiment, the beam shape transformer comprises two or more interchangeable sets of fixed zoom lenses, each arranged to provide a predetermined transformation of the cross-sectional shape.

In one embodiment, one or more of the cylindrical lenses is modified to further selectively control the cross-sectional extension of the collimated beam of light essentially in a direction parallel to the extension direction of the line shaped illumination area, i.e. Y direction in FIG. 2. By this, the shape of the illumination of back apertures for the different objective lenses may be further optimized.

Figure 1:
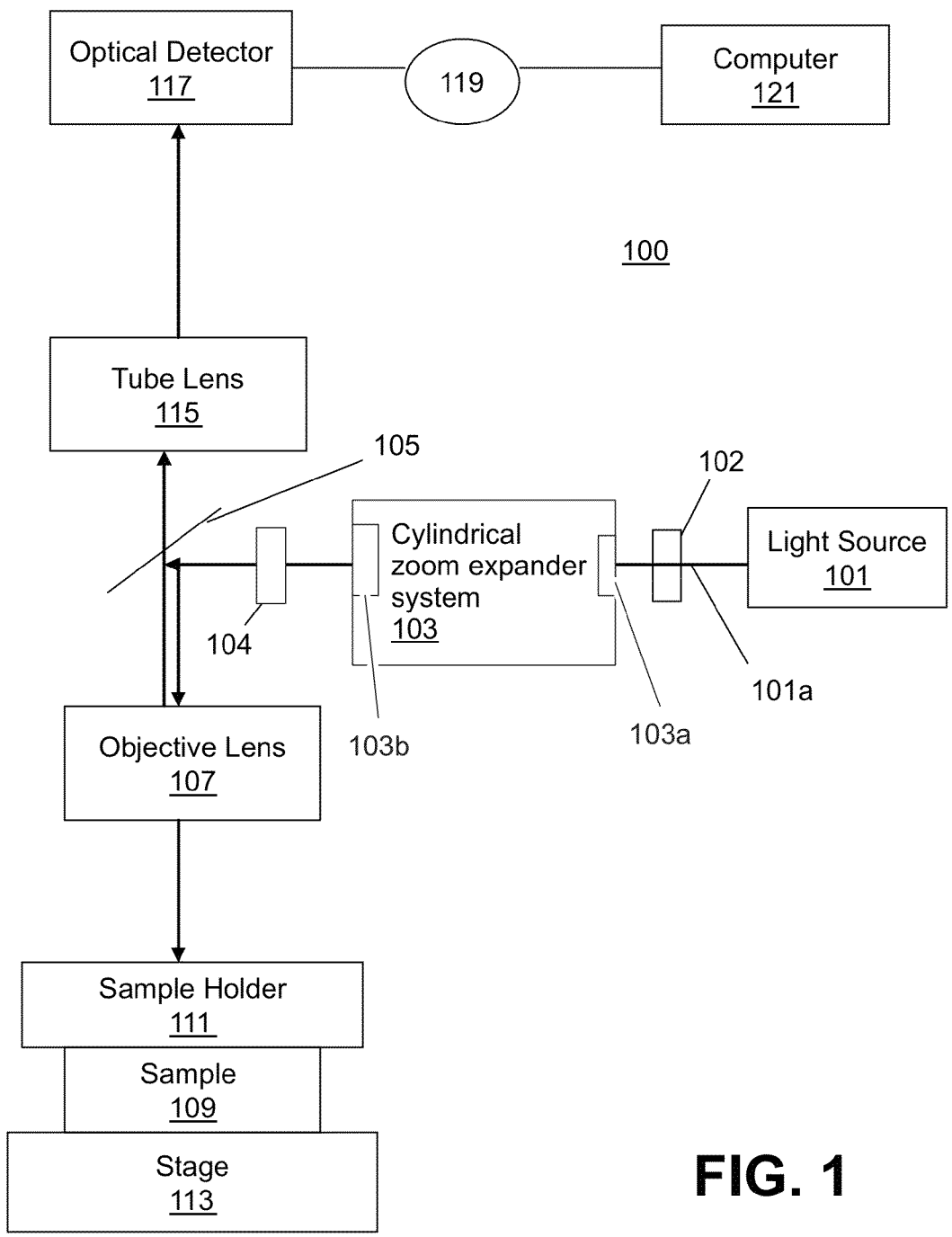
FIG. 1 is a block diagram of a line scanning imaging system that includes a cylindrical zoom beam expander in accordance with the invention.

FIG. 1 illustrates a block diagram of the essential components of one embodiment of a line scanning microscope system that includes a cylindrical zoom beam expander system. The disclosed microscope system 100 includes the following components: a light source 101, a collimator 102, a cylindrical zoom beam expander system 103, aspherical optics 104, beam folding optics 105, objective lens 107, a sample 109, a sample holder 111, a stage, 113, a tube lens 115, an optical detector 117, an optional communication link 119 and an optional computer 121.

Light source 101 may be a lamp, a laser, a plurality of lasers, a light emitting diode (LED), a plurality of LEDs, or any type of light source known to those of ordinary skill in the art that generates a light beam 101a. Light beam 101a is emitted by: the light source 101, and transmitted through collimator 102, cylindrical zoom beam expander system 103, aspherical optics 104, beam-folding optics 105 and objective lens 107 to illuminate the sample 109. Sample 109 may be live biological organisms, biological cells, non-biological samples, or the like. Aspherical optics 104 may be a Powell lens or the like, arranged to transform the light beam 101a into a line shaped beam at the sample. Beam-folding optics 105 is a scanning mirror or the like arranged to direct the light beam 101a on the back aperture of the objective 107 and to scan the beam. In order to view the sample in different magnifications, the microscope comprises two or more objectives 107 of different magnification, e.g. 10× and 20× or the like. The light emitted or reflected from the sample 109 is collected by the objective lens 107, and then an image of the sample 109 is formed by the typical tube lens 115 on the optical detector 117. The optical detector 117 may be a photomultiplier tube, a charged coupled device (CCD), a complementary metal-oxide semiconductor (CMOS) image detector or any optical detector utilized by those of ordinary skill in the art. Optical detector 117 is optionally, electrically or wirelessly, connected by the communication link 119 to the computer 121. In another embodiment, the optical detector 117 may be replaced with a typical microscope eyepiece or oculars that work with objective 107 to further magnify intermediate image so that specimen details can be observed. Sample 109 is mounted on the sample holder 111, which may be referred to as a typical microtiter plate, a microscope slide, a chip, plate of glass, Petri dish, or any type of sample holder.

In another embodiment, the microscope system 100 optionally, may be electrically or wirelessly, connected by a communication link 119 to the conventional computer 121. The communication link 119 may be any network that is able to facilitate the transfer of data between the automated microscope system 100 and the computer 121, such as a local access network (LAN), a wireless local network, a wide area network (WAN), a universal service bus (USB), an Ethernet link, fiber-optic or the like. The microscope may also have a plurality of objective lenses 107. The computer 121 may be referred to as an image detection device. In another embodiment of the invention, the image-detecting device 121 may be located inside of the digital microscope 100. The image detecting device 121 acts as a typical computer, which is capable of receiving an image of the sample 109 from the optical detector 117, then the image detecting device 121 is able to display, save or process the image by utilizing a standard image processing software program, algorithm or equation.

The microscope system 100 has been depicted schematically in FIG. 1 with only the essential components highlighted.

Figure 3:
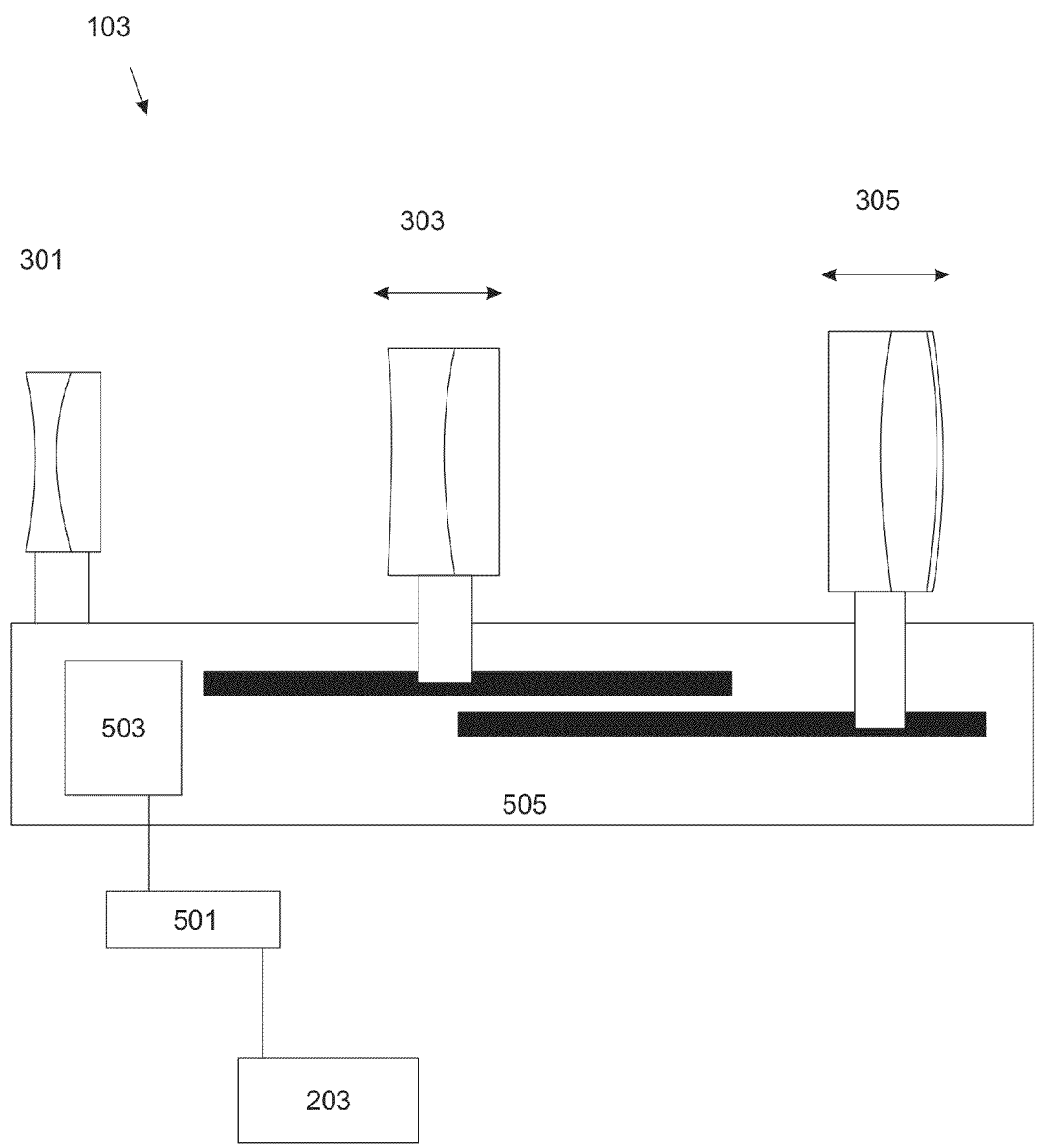
FIG. 3 is a schematic illustration of the cylindrical zoom beam expander system of FIG. 1 in accordance with the invention.
Figure 4:
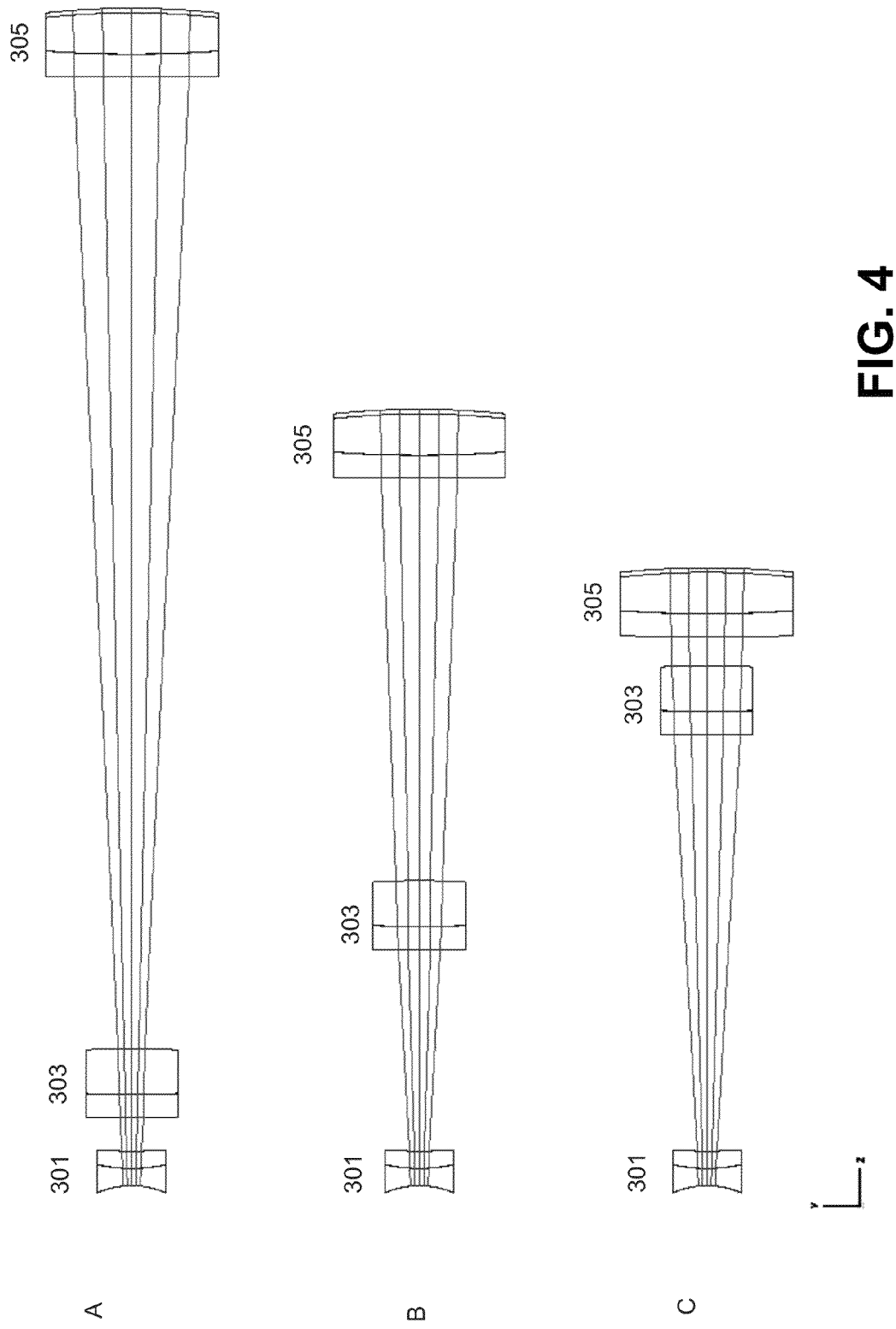
FIG. 4 is a graphical illustration of three different relative positions of the cylindrical lens doublets in a cylindrical zoom beam expander design.

FIG. 2 schematically shows the microscope of FIG. 1 in perspective with the light beam 101a represented by a plurality of rays in the X and Y direction respectively to illustrate the beam profile along the optical path of the microscope. The light source 101 emits a light cone that is collimated by the collimator 102 to form a collimated beam of light. As the collimated beam 101a passes through the cylindrical zoom beam expander 103 (e.g. as depicted in FIGS. 3 and 4), it is expanded (or compressed) in the X direction only. The beam profile along the Y axis remains constant. This sort of profile expansion (or compression) reshapes the circular beam to an elliptical form 101b. Next, the aspherical optics (AO) component 104 (e.g., a Powel lens) focuses the beam onto a 45-degree scanning reflective optics (SRO) 105, reflecting the beam in the Y direction towards the objective lens. After reflection by the mirror, the shape of the beam resembles a wedge 101c. It is angularly dispersed in the Y direction and maintains its parallelism in the X direction. The objective lens 107 eventually focuses the beam preconditioned by the aspherical optics 104 as a uniform excitation line 101d in the Y direction on the sample. The uniformity of the excitation line on the sample critically depends on the aspherical optics 104 and beam expander designs 103, as is illustrated in FIGS. 7a to 7f below.

In general, the aspherical optics 104 cannot be adjusted and therefore it is desired to have a system to adjust beam dimension in the X direction. The cylindrical zoom beam expander is such a system. The beam-filling of the objective back aperture in the Y direction can always be selected by fixing the distance between the scanning optics and the objective lens to an appropriate value. In the X direction, the back aperture filling status of the objective lens is essentially determined by the beam dimension in same direction.

FIG. 3 is a schematic illustration of one embodiment of a cylindrical zoom expander system 103 according to the present invention. The cylindrical zoom beam expander of FIG. 3 is comprised of three cylindrical doublets 301, 303, and 305. The entire design resembles a reversed Galileo telescope that functions only in one direction due to the cylindrical design of the lenses. The first doublet 301 is a negative cylindrical lens; the second 303 and third 305 doublets form a positive cylindrical lens, whose focal length can be adjusted by varying their inter-distance by the zoom-mechanism 505. The beam width in the X direction can be expanded by moving doublets 2 and 3 according to a function derivable from laws of geometric optics.

In FIG. 3 a schematic zoom control system is disclosed, wherein a computer 121 or computer 203 is connected to a typical controller 501, which is arranged to control one or more zoom actuator 503. The zoom actuator 503 may be a stepping motor, a direct current (DC) motor, a servo-motor, a piezo-electric motor or a solenoid. This zoom actuator 503 is arranged to drive a zoom mechanism 505, which may be a typical mechanical gear (full or partial gear), belt or chain system, belt/pulley, friction-based spindles, friction drive or other mechanisms known to those of ordinary skill in the art.

This particular zoom mechanism 505 is attached to doublet 2 (303) and doublet 3 (305) and is used to controls the inter-distance between the three cylindrical doublets 1, 2 and 3.

FIG. 4 shows an exemplary model of the cylindrical zoom beam expander in three different zoom positions corresponding to different objective lenses. Other cylindrical zoom beam expander design embodiments are also possible.

Figure 5:
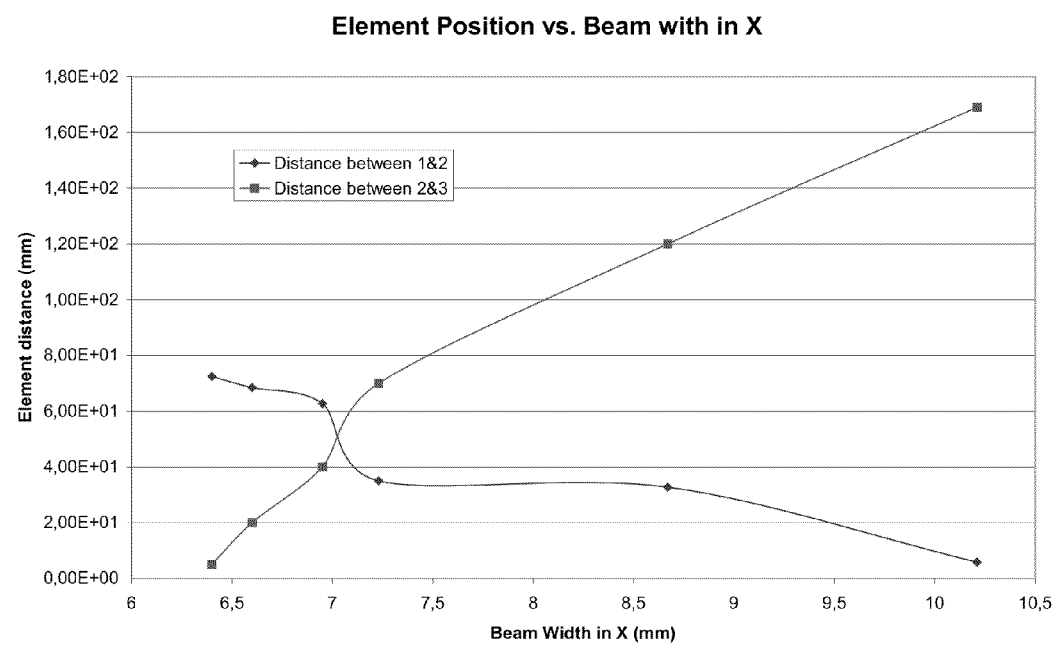
FIG. 5 is a graphical illustration of doublets 1, 2 and 3 positions versus an output beam width from a light source of FIG. 1 in accordance with the invention.

In another embodiment of the invention as shown in FIG. 5, there is a graphical illustration of the doublet 1, 2 and 3 relative positions versus an output width from the cylindrical beam expander in the X direction, whereas the beam width in the Y direction is essentially unchanged. In this example, the input beam has a width of 3 mm and the output beam can be increased to a width of more than 10.4 mm by simultaneously adjusting the positions of doublet 2 and 3. For example, if the output beam width needs to be 8.7 mm, then the doublet positions 2 and 3 should be such that the distance between doublets 1 and 2 should be 3.3 mm and the distance between doublets 2 and 3 should be 120 mm.

Figure 6:
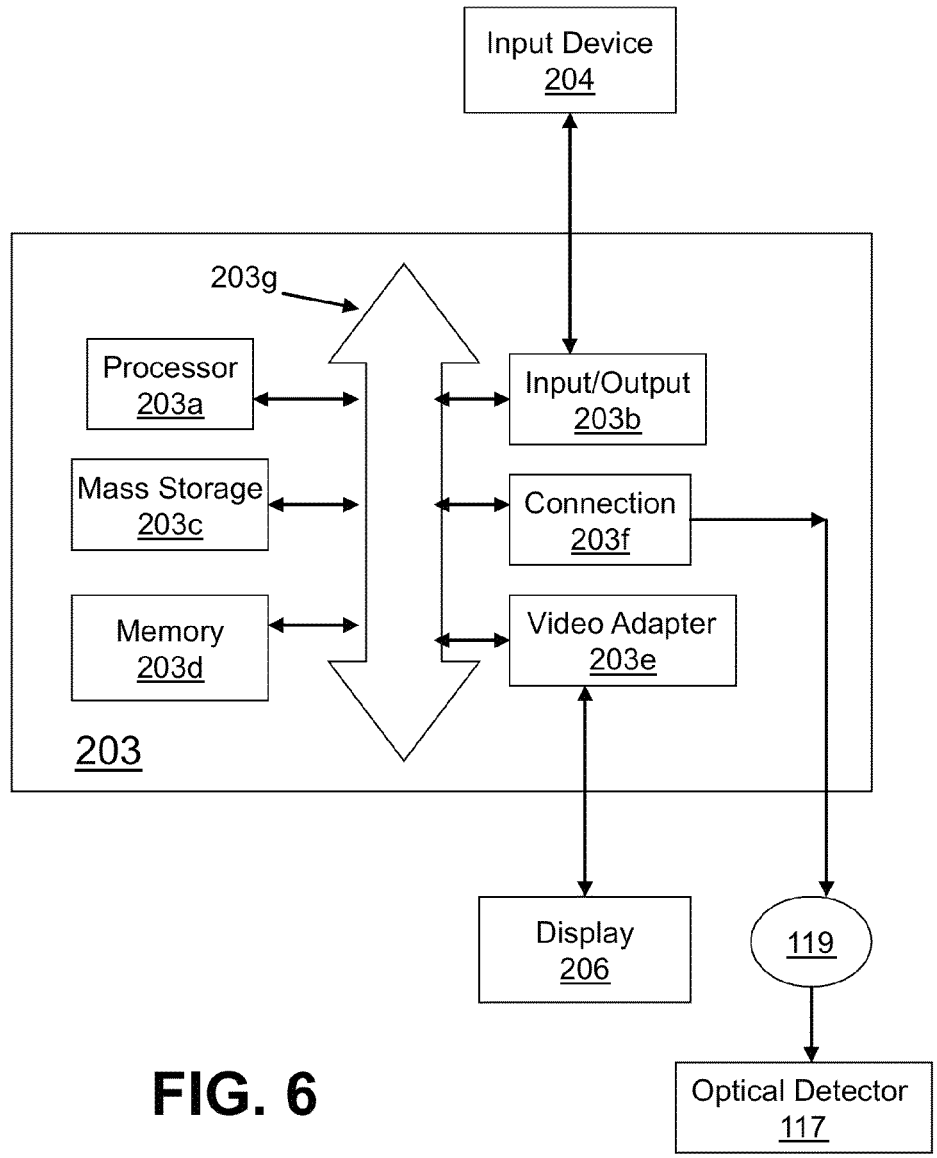
FIG. 6 is a schematic of an image-receiving device of FIG. 1 in accordance with the invention.

FIG. 6 illustrates a schematic diagram of the image-receiving device of the cylindrical zoom beam expander system of FIG. 1. Computer 121 may be known as an imaging receiving device 203 includes the typical components associated with a conventional computer. Image receiving device 203 may also be stored on the image transmitting system 100. The image receiving device 203 includes: a processor 203a, an input/output (I/O) controller 203b, a mass storage 203c, a memory 203d, a video adapter 203e, a connection interface 203f and a system bus 203g that operatively, electrically or wirelessly, couples the aforementioned systems components to the processor 203a. Also, the system bus 203g, electrically or wirelessly, operatively couples typical computer system components to the processor 203a. The processor 203a may be referred to as a processing unit, a central processing unit (CPU), a plurality of processing units or a parallel processing unit. System bus 203g may be a typical bus associated with a conventional computer. Memory 203d includes a read only memory (ROM) and a random access memory (RAM). ROM includes a typical input/output system including basic routines, which assists in transferring information between components of the computer during start-up.

Input/output controller 203b is connected to the processor 203a by the bus 203g, where the input/output controller 203b acts as an interface that allows a user to enter commands and information into the computer through the GUI and input device 204, such as a keyboard and pointing devices. The typical pointing devices utilized are joysticks, mouse, game pads or the like. A display 206 is electrically or wirelessly connected to the system bus 203g by the video adapter 203e. Display 206 may be the typical computer monitor, plasma television, liquid crystal display (LCD) or any device capable of having characters and/or still images generated by a computer 121. Next to the video adapter 203e of the computer 203, is the connection interface 203f. The connection interface 203f may be referred to as a network interface that is connected, as described above, by the communication link 119 to the optical detector 117. Also, the image-receiving device 203 may include a network adapter or a modem, which enables the image-receiving device 203 to be coupled to other computers.

Above the memory 203d is the mass storage 203c, which includes: 1. a hard disk drive component (not shown) for reading from and writing to a hard disk and a hard disk drive interface (not shown), 2. a magnetic disk drive (not shown) and a hard disk drive interface (not shown) and 3. an optical disk drive (not shown) for reading from or writing to a removable optical disk such as a CD-ROM or other optical media and an optical disk drive interface (not shown). The aforementioned drives and their associated computer readable media provide non-volatile storage of computer-readable instructions, data structures, program modules and other data for the computer 203. Also, the aforementioned drives include the technical effect of having an algorithm for adjusting the doublets of the cylindrical zoom beam expander, software or equation of this invention. Further, the aforementioned drives are included in the beam-filling table shown below. This beam filling table includes the objective lens, lens aperture, beam width necessary to fill aperture for the objective lens, doublet 1 position, doublet 2 position and doublet 3 position.

Within the software program for adjusting the cylindrical zoom beam expander system 103 or the doublets there may be a cylindrical zoom beam expander graphical user interface (GUI). The cylindrical zoom beam expander graphical user interface may be a specially programmed GUI that has some of the same functionality as a typical GUI, which is a software program designed to allow a computer user to interact easily with the computer 203. The cylindrical zoom beam expander GUI may include a screen shot that displays: 1. objective lens magnification, such as 2×, 4×, 10×, 20×, 40× and 60×, 2. Lens aperture for each objective lens, such as 20-10 mm for 2×, 4×, 10× or 20× objective lens, such as 6 mm for 40× and 4.7 mm for 60×. 3. An initial beam size for beam 101a and exiting beam size for beam 101a, 4. Doublet positions for the various objective lenses.

FIG. 4 illustrates three examples positions for the three sets of the lens doublets at different relative positions utilized in a cylindrical zoom beam expander system, which give different resulting beam sizes. Each of the doublets has two lenses or two pieces of glass that are glued to each other. Doublet 301, has 1 concave lens and 1 convex lens glued together so it is a negative cylindrical lens. For the doublets 303 and 305, two convex lenses are glued to each other so these doublets are positive cylindrical lens whose focal length can be adjusted by varying their distance. These doublets are utilized to expand the beam 101a in FIG. 1 that will enter through a first end 103a of the cylindrical zoom beam expander system 103 and exit through a second end 103b of the cylindrical zoom beam expander system 103. Beam 101a will be expanded in only a X-direction so its shape would change from a circular shape when it enters the cylindrical zoom beam expander system 103 to an elliptical shape when it exits the cylindrical zoom beam expander system 103. The distance between the doublets 301 and 303 and doublets 303 and 305; determines the size of the beam 101a exiting the cylindrical zoom beam expander system 103. In the disclosed embodiment, the cylindrical beam expander is a zoomable device, capable to be controlled to provide a desired beam shape for a wide range of objectives. According to another embodiment, the cylindrical beam expander may be comprised of a set of fixed beam expander lens-combinations that may be selectively inserted into the beam path, much like how objective lenses are exchanged to achieve different magnification.

In a control software application the state of the cylindrical zoom beam expander is controlled in accordance with the objective lens 107 selected by the user. According to one embodiment the mass storage 203c of the computer 203 includes a beam-filling table associated with the objective lens 107 aperture as shown in example table below:

| Objective Lens | 2, 4, 10 and 20X | 40X | 60X |
| --- | --- | --- | --- |
| Lens Aperture | 10-20 mm | 6 mm | 4.7 mm |
| Beam size | 10 mm | 8 mm | 6.5 mm |
| Doublet 2 position | 70 mm | 35 mm | 3 mm |
| Doublet 3 position | 168 mm | 95 mm | 75 mm |

Figure 7A:
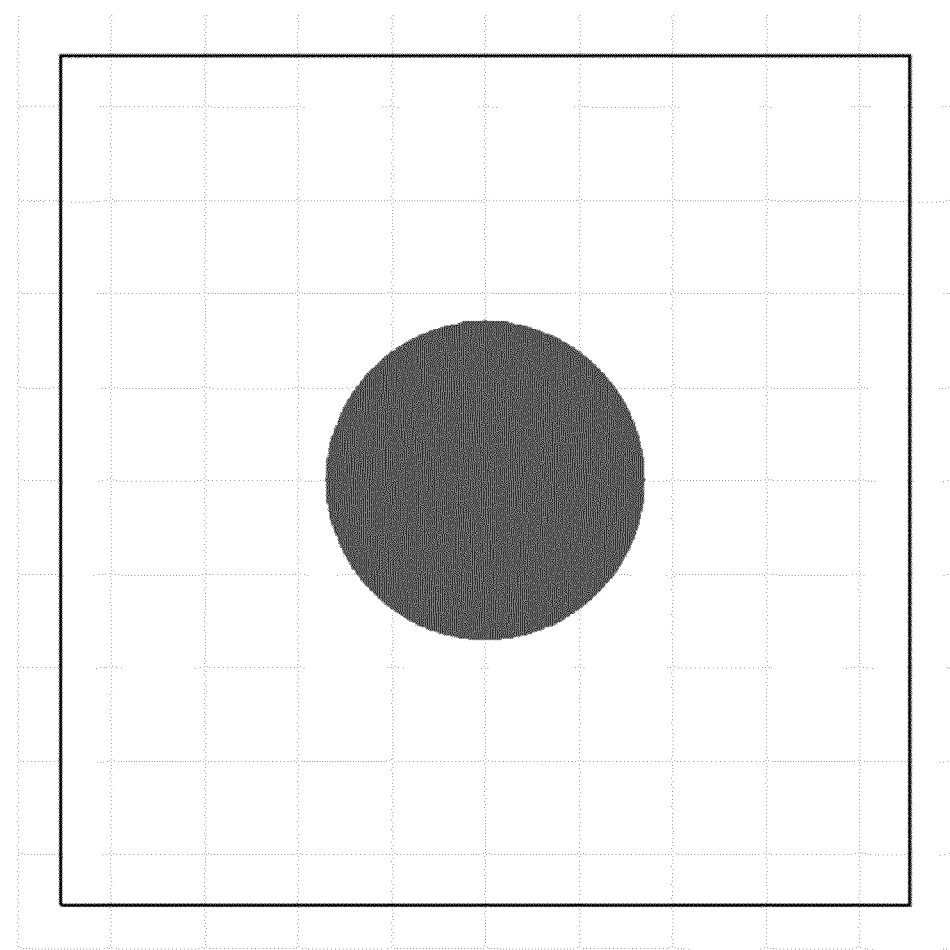
FIGS. 7A and 7B show graphical illustrations of a beam footprint of the aspherical optics 104 (without zooming) and the light intensity distribution of the line excitation on the sample (without zooming) in accordance with the invention.
Figure 7B:
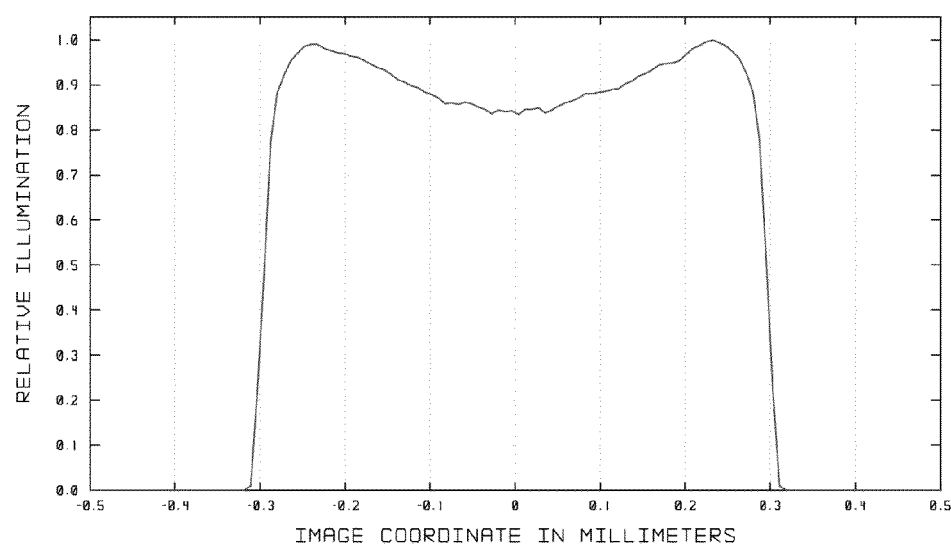

FIGS. 7A and 7B show a graphical illustration of a beam footprint of the Aspherical Optics 104 (without zooming) and the light intensity distribution of the line excitation on the sample (without zooming) A uniform line illumination on the sample 109 is generated when using aspherical optics 104 along with objective lens 107. Due to the reason that aspherical optics 104 only works in Y direction, the focused beam distribution on the sample 109 in y direction is determined by the aspherical optics 104. The width at the sample 109 at the X direction is 2 micron and the width at the Y direction is 0.6 mm. Without zoom lens, the collimator has to be so selected that the beam width in y direction works well with AO. FIG. 7A shows the input beam diagram in the AO input port. The intensity profile of focused beam line along the Y direction on the sample is shown in FIG. 7B; the line intensity distribution is nearly uniform. The problem for this case is the beam width in X direction is small and does not fill the aperture of the objective lens and the focused line width on the sample is 2 micron, which is two times less than that of full filling scenario.

Figure 7C:
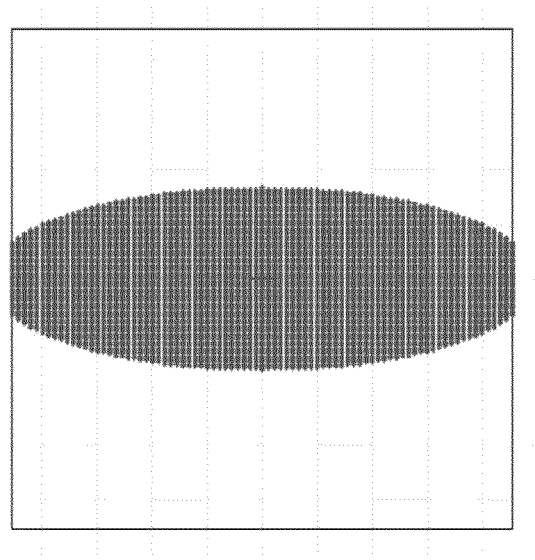
FIGS. 7C and 7D show graphical illustrations of a beam footprint of the aspherical optics 104 at 3× zooming in X direction and nearly uniform light intensity distribution of excitation line on the sample at 3× zooming using a cylindrical zoom in accordance with the invention.
Figure 7D:
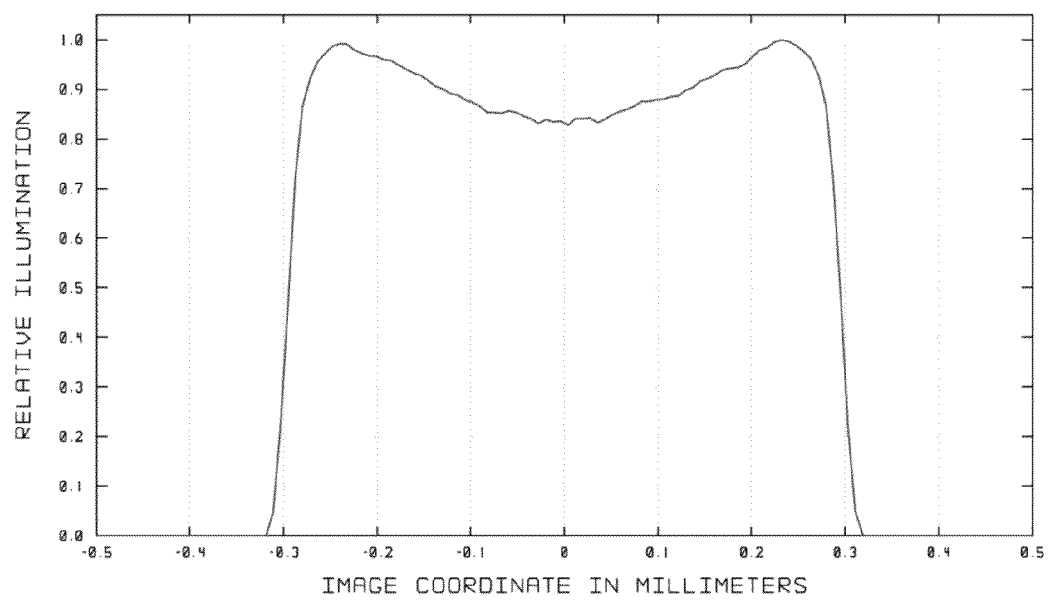

FIGS. 7C and 7D show a graphical illustration of a beam footprint of the aspherical optics 104 at 3× zooming in X direction and nearly uniform light intensity distribution of excitation line on the sample at 3× zooming using a cylindrical zoom. The line width at the sample 109 at the X direction is 1 micron and the width at the Y direction is 0.6 mm. When using cylindrical zoom lens, the beam width in y direction keeps constant and works well with aspherical optics 104.

FIG. 7C shows the input beam diagram in the aspherical optics 104 input port. The input beam with in X direction filled up aspherical optics input aperture. The increase of the beam width in X increased the filling on the objective aperture, which results in sharp focused laser line illumination on the sample 109. The intensity profile of the focused beam line on the sample is shown in FIG. 7D; the line intensity distribution is nearly uniform. The numerical examples shown here are only for the purpose of clarification and do not limit the scope of this invention.

Figure 7E:
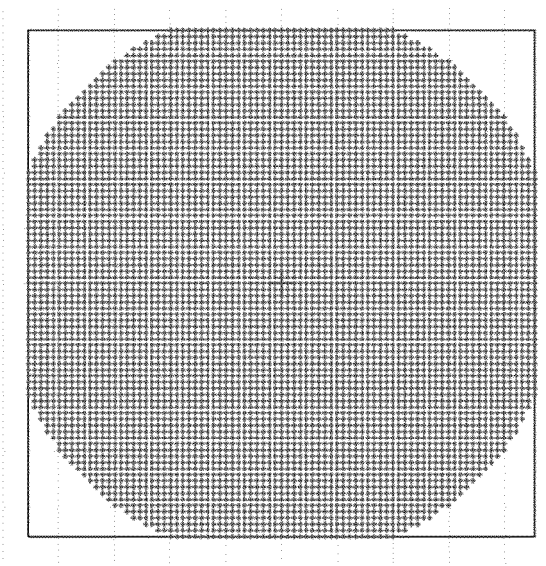
FIGS. 7E and 7F show graphical illustrations of simulation results comparing beam shape provided with usage of conventional zoom.
Figure 7F:
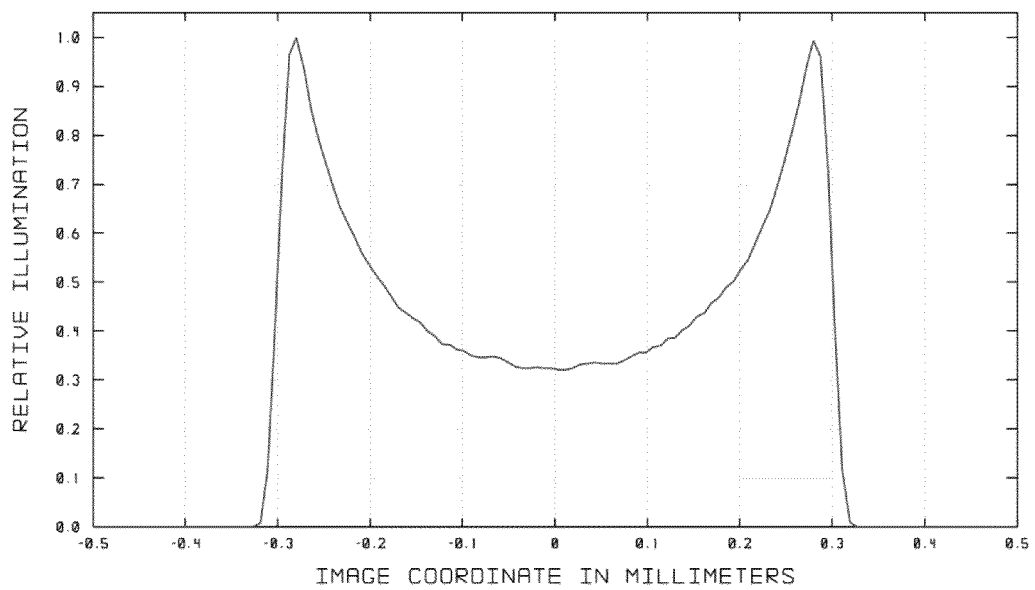

FIGS. 7E and 7F show graphical illustrations of numerical simulation results comparing performance with/without usage of the zoom. When using a conventional zoom lens, the beam width increased in both x and y direction. The width at the sample 109 at the X direction is 1 micron and the width at the Y direction is 0.6 mm. The beam width in the y direction is not adjusted properly with aspherical optics 104, resulting in non-uniform line illumination on the sample 109. FIG. 7E shows the input beam diagram in the aspherical optics 104 input port. The input beam fills up the input aperture of the aspherical optics 104. However, the increase of the beam width in Y results in non-uniform illumination on sample, as shown in FIG. 7F; the line illumination intensity distribution is not uniform.

This invention provides a system for adjusting an illumination beam in an imaging system to provide optimized illumination. The user is able to expand or collapse a light beam that is transmitted from the light source to a sample. By expanding the light beam emitted from the light source, the user is able to view the image of the sample where the back aperture is illuminated so the entire image of the sample is shown. The user is able to optimize the light throughput and numerical aperture of the system regardless of which objective lens is utilized in order to view the image of the sample. Thus, the user is provided with a simple adjustable system that provides full illumination of the back apertures for all of the supported objectives.

The presently preferred embodiments of the invention are described with reference to the drawings, where like components are identified with the same numerals. The descriptions of the preferred embodiments are exemplary and are not intended to limit the scope of the invention.

Although the present invention has been described above in terms of specific embodiments, many modification and variations of this invention can be made as will be obvious to those skilled in the art, without departing from its spirit and scope as set forth in the following claims.

What is claimed is:

1. A line confocal microscope system, comprising an illumination system with a source of collimated light and a line forming optics arranged to provide a line shaped illumination area to be scanned over a sample, an image receiving system, and two or more objective lenses that are interchangeable in the optical path to provide different magnification, wherein the objective lenses have different aperture diameters, and the illumination system comprises a beam shape transformer in the form of a cylindrical zoom expander comprising two or more cylindrical lenses arranged in between the source of collimated light and the line forming optics to selectively transform the cross-sectional shape of the collimated beam of light transmitted to the line forming optics to a predetermined shape in response to the back aperture diameter of the objective lens that is arranged in the optical path, wherein the line forming optics is of aspherical type and the beam shape transformer is arranged to selectively control the cross-sectional extension of the collimated beam of light essentially in a direction transverse to the extension direction of the line shaped illumination area.

2. The line scan confocal microscope of claim 1, wherein the beam shape transformer comprises a fixed entrance lens, and two zoom lenses mutually moveable along the optical path.

3. The line scan confocal microscope of claim 2, comprising a control system arranged to control the moveable lenses of the beam shape transformer to predetermined positions in response to the back aperture diameter of the objective lens that is arranged in the optical path.

4. The line scan confocal microscope of claim 1, wherein the beam shape transformer comprises two or more interchangeable sets of fixed zoom lenses, each arranged to provide a predetermined transformation of the cross-sectional shape.

5. The line scan confocal microscope of claim 1, wherein one or more of the cylindrical lenses is modified to further selectively control the cross-sectional extension of the collimated beam of light essentially in a direction parallel to the extension direction of the line shaped illumination area.

\* \* \* \* \*